(No Model.) 2 Sheets—Sheet 1.

H. BURGESS.
GLASS MELTING FURNACE.

No. 451,287. Patented Apr. 28, 1891.

Witnesses:
Edwin L. Bradford
C. D. Davis

Inventor:
Hugh Burgess
By C. M. Alexander
Attorney.

(No Model.) 2 Sheets—Sheet 2.
H. BURGESS.
GLASS MELTING FURNACE.
No. 451,287. Patented Apr. 28, 1891.
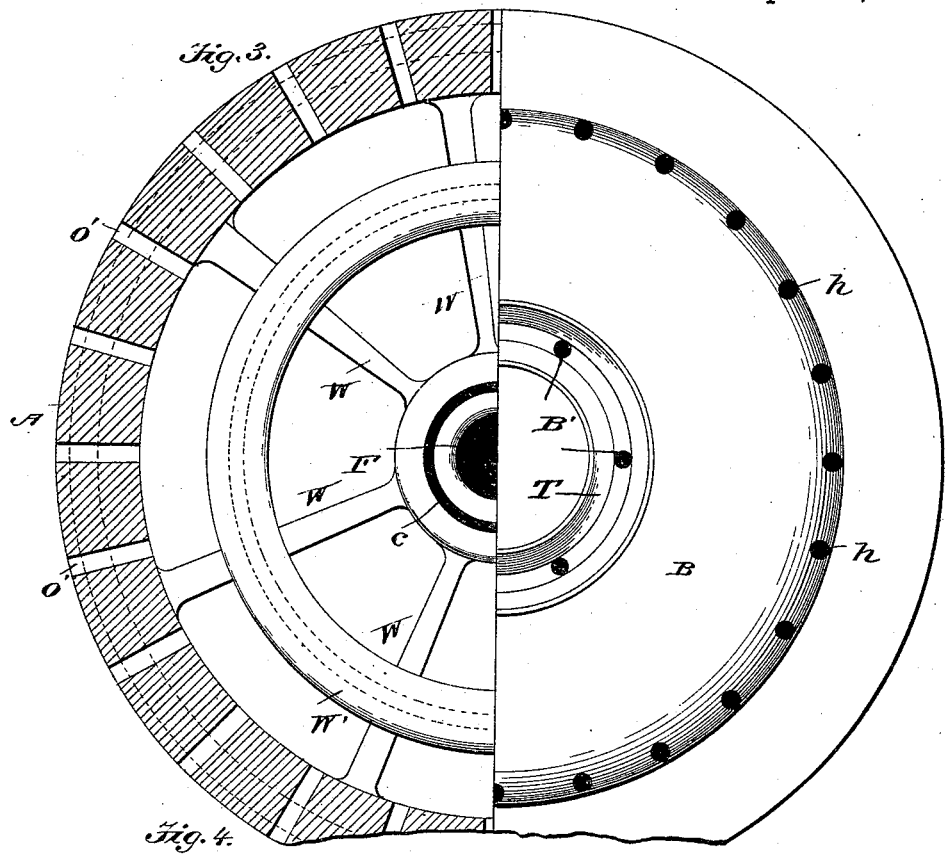
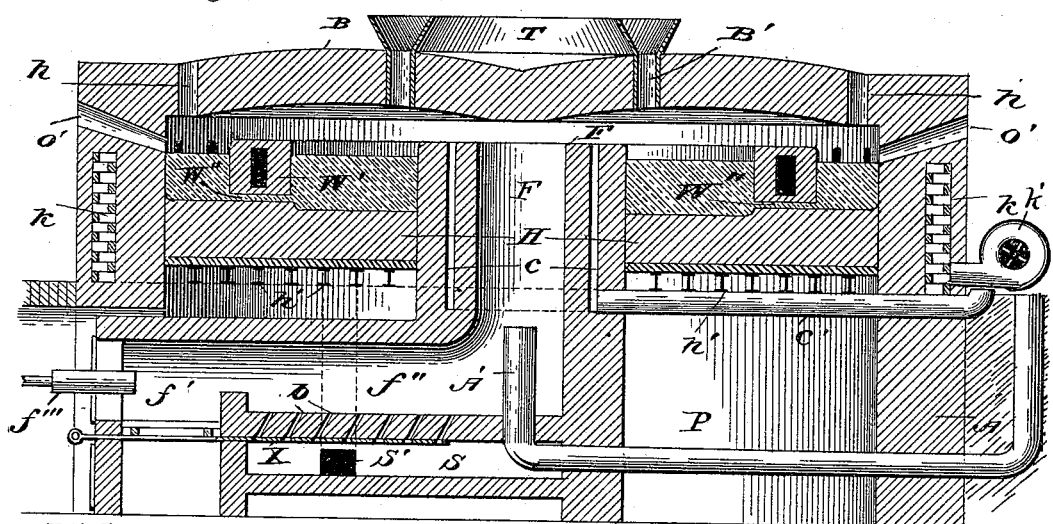

UNITED STATES PATENT OFFICE.

HUGH BURGESS, OF ROYER'S FORD, PENNSYLVANIA.

GLASS-MELTING FURNACE.

SPECIFICATION forming part of Letters Patent No. 451,287, dated April 28, 1891.

Application filed August 19, 1890. Serial No. 362,413. (No model.)

*To all whom it may concern:*

Be it known that I, HUGH BURGESS, a subject of the Queen of Great Britain, residing at Royer's Ford, in the county of Montgomery and State of Pennsylvania, have invented certain new and useful Improvements in Glass Pots or Melting Furnaces, of which the following is a specification, reference being had therein to the accompanying drawings.

Figure 1:
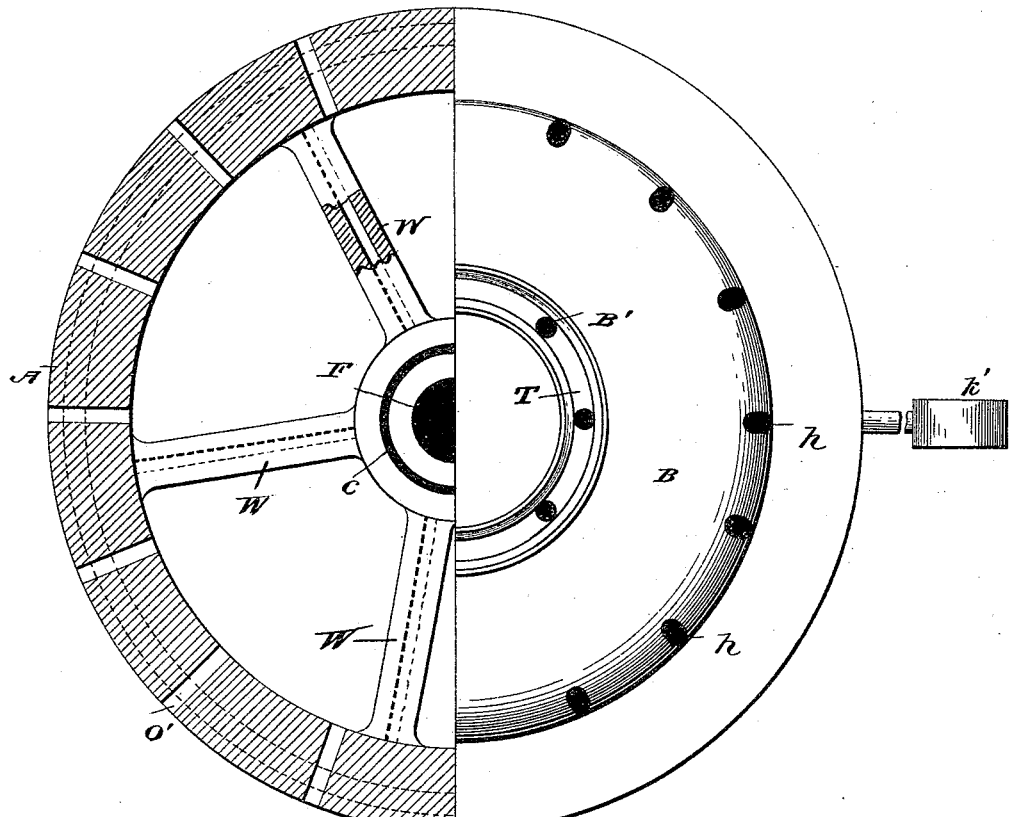
Figure 2:
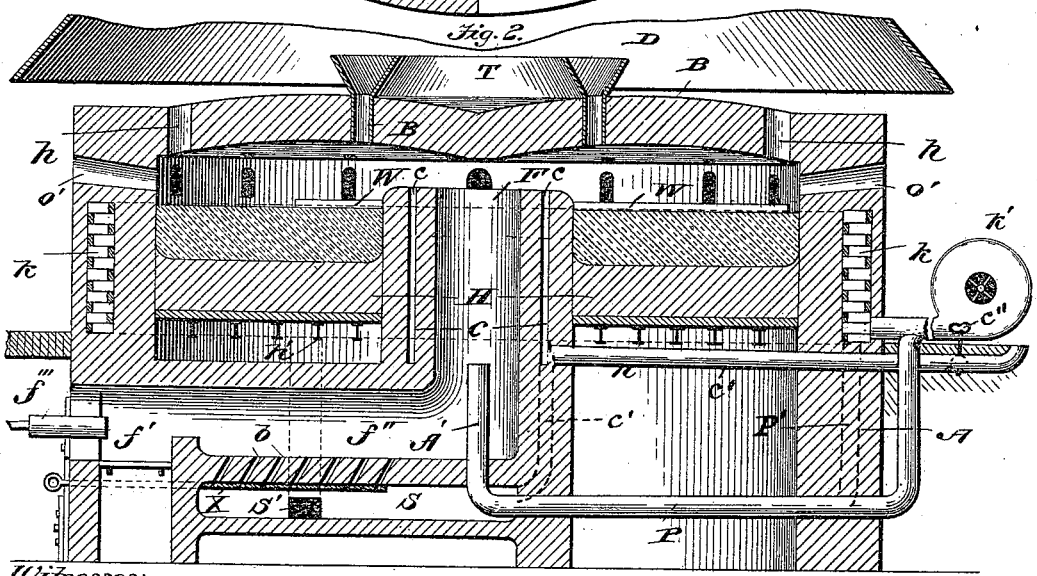

Referring to the accompanying drawings, Figure 1 represents a partial plan and horizontal sectional view of one form of my improved glass pot or furnace; Fig. 2, a vertical central sectional view of the same; Fig. 3, a similar view to Fig. 1, showing a slightly-different form of pot; Fig. 4, a vertical sectional view of the apparatus shown in Fig. 3.

Referring to the drawings by letter, A designates the outer masonry wall of the melting furnace or pot, which may be either circular in form, as shown and preferred, or any other shape, and which is preferably extended a suitable distance below the surface of the ground. The circular wall A is roofed over by a dome-like roof B, which is slightly depressed in its center, and is provided near its center with the series of charging-openings B′, and near its edge with the circular series of outlet-openings $h$, the said central depression in the roof serving to deflect and distribute the hot gases equally in all directions. The circular melting-hearth H is supported a suitable distance from the roof of the furnace by suitable horizontal bars or beams $h'$, and extending up through this hearth is a vertical circular flue F, which terminates a suitable distance below the roof and communicates at its lower end with the combustion-chamber $f''$ of a furnace $f'$, arranged below the hearth. The furnace is provided with a series of grate-bars and has extended into it above the grate a pipe $f'''$, which serves to conduct the liquid or gaseous fuel into the furnace, as will more fully hereinafter appear.

The floor of the combustion-chamber is provided with a series of openings $b$, which communicate with a hot-air chamber S below, this chamber being kept supplied with hot air by means of the flue S′, which leads to and communicates with an annular chamber $k$, formed in the wall of the apparatus and preferably filled with brick checker-work. Fresh air is continuously supplied to this annular chamber $k$ by a suitable fan-blower $k'$. The air passing through the checker-work in chamber $k$ through the flue S′ and chamber S becomes very highly heated, and in that condition is fed in numerous small currents to the combustion-chamber.

Extending up through the floor of the combustion-chamber into the flue F is a fresh-air flue A′, which derives its supply of air through the medium of the pipe P, which extends to the outside atmosphere in any suitable manner, and which may be fed by the fan-blower $k'$, as shown in Fig. 2, or which may open out into the atmosphere, as shown in Fig. 4.

Formed in the flue F is an annular air-space $c$, which is connected at its lower end with flues $c'$ $c'$ (which extend to the outer atmosphere) and is open at its upper end, whereby a supply of fresh heated air is continuously supplied to the flame issuing from the upper end of the flue. It is evident that the flues $c'$ may connect with the hot-air chamber S, as shown in dotted lines in Fig. 2, if so desired, provided that the air issuing from this chamber is not so hot as to fuse the walls of the chamber $c$ in the flue.

The hearth, as shown in Figs. 1, 2, and 3, may be provided with hollow partitions W, which extend radially from the flue F to the outer wall, and thereby divide the hearth up into a series of segmental sections for the reception of glass of different qualities and colors. These division-walls extend a few inches above the level of the melted glass, so as to keep the different qualities and colors separate and yet not obstruct the free distribution of the products of combustion throughout the melting-chamber. Take-out holes $o'$ are formed at suitable intervals in the wall A.

A hood D of the usual construction may be arranged over the apparatus to carry off the products of combustion and the heat.

The operation of the furnace as thus constructed is as follows: A small coal fire is kept burning upon the grate in the furnace. Gas from a suitable generator or produced by a coal-oil burner is supplied by the pipe $f'''$ to the furnace $f'$, where it is ignited by the burning coals on the grate-bars, from whence the resultant gases and products pass onto the combustion-chamber $f''$, where they meet and commingle with the fine currents of highly-heated air being continuously forced up through the openings in the floor of the combustion-chamber by means of the fan-blower. The commingled and combined gases pass on while in a state of combustion up the flue F, where they meet with an additional supply of air drawn or forced through the flue P. As the burning gases and products emerge from the top of the flue F they are met by another supply of heated air from the annular chamber $c'$, which supply completes the combustion. The products of this combustion while in a very highly-heated state distribute themselves over the entire space above the glass on the hearth and finally pass out at the exits $h$ near the edge of the furnace. The "batch" of glass may be introduced through the charging-openings all at one time, as usual, or it may be fed continuously thereto by means of a circular trough or pan T and suitable conveying apparatus of the ordinary construction. When the glass on the hearth is melted and at a proper temperature, the flow of gas to the furnace F' may be reduced and a saving thereby effected.

As shown in Figs. 3 and 4, the hearth may also be divided into circular compartments by a hollow circular concentric wall W', which is provided with passages W'' underneath it, through which the melted glass may flow from the inner compartment to the outer one as fast as used. This wall serves to separate the thoroughly-melted glass from that undergoing the proper fusion, the charging-openings B' being directly over the inner compartment. This division-wall is particularly advantageous when the batch is fed continuously in regulated quantities instead of all at once, as in the usual method, as is evident.

To those skilled in the art the advantages of this invention will be readily understood. Among them might be mentioned the great economy in the use of fuel, the large number of workmen this apparatus will accommodate at one time, the means provided for melting in the same apparatus different qualities and colors of glass, and the facilities afforded for feeding and working the apparatus continuously.

A suitable damper X may be employed to regulate the supply of air to the combustion-chamber.

Instead of extending the flue P to the outside atmosphere or connecting it to a fan-blower, as shown, it is evident that it may be connected to the flue $k$ in the wall of the furnace, if desired, so that it may be supplied with heated air, as shown by dotted lines at P' in Fig. 2.

To regulate the supply of air to the annular space $c$ in the flue the pipe $c'$ may be provided with a damper, as shown at C, Fig. 2.

As it is obvious that the principle and construction of this furnace and the manner of heating it by heated gases are also applicable for the heating of the glass-pots in common use arranged on the hearth, (these pots being worked in the ordinary way through the take-out holes around the walls of the furnace,) I do not wish to confine myself in this respect.

Having thus fully described my invention, what I claim, and desire to secure by Letters Patent, is—

1. In a glass-furnace, the combination of a structure having a roof depressed to a point in its center, a melting-hearth supported within the structure, and a gas-flue extending up centrally through the said melting-hearth and terminating below the central depression in the roof, substantially as described.

2. In a glass-melting furnace, the combination of a structure provided with a melting-hearth and a roof, the said roof being provided with central charging-openings and smoke-exit openings and the said structure with take-out openings, a vertical central flue extending up through the hearth, a stationary division-wall arranged on the hearth between the said central flue and the take-out openings, this wall extending above the level of the glass and provided with openings through it below the level thereof, and radial division-walls arranged on the hearth and extending from the central flue to the outer walls, as and for the purposes herein set forth.

3. The combination of a structure provided with a melting-hearth and a roof, the structure and roof being provided with suitable openings, a central gas-flue extending up through the hearth, and a combustion-chamber connected to this central flue, an annular air-space surrounding this central flue and opening into the melting-chamber, and a valved pipe connected to this circular chamber and extending to the outer atmosphere, substantially as and for the purposes described.

In testimony whereof I affix my signature in presence of two witnesses.

HUGH BURGESS.

Witnesses:
A. C. GREEN,
L. A. HAINES.